United States Patent
Li et al.

(10) Patent No.: US 10,067,707 B2
(45) Date of Patent: Sep. 4, 2018

(54) SYSTEM AND METHOD FOR DETERMINATION AND REALLOCATION OF PENDING SECTORS CAUSED BY MEDIA FATIGUE

(71) Applicant: ALIBABA GROUP HOLDING LIMITED, George Town, Grand Cayman (KY)

(72) Inventors: Shu Li, Santa Clara, CA (US); Wei Zou, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 154 days.

(21) Appl. No.: 14/953,788

(22) Filed: Nov. 30, 2015

(65) Prior Publication Data

US 2016/0266841 A1  Sep. 15, 2016

Related U.S. Application Data

(63) Continuation of application No. 14/643,469, filed on Mar. 10, 2015, now Pat. No. 9,208,817.

(51) Int. Cl.
| | |
|---|---|
| *G11B 27/36* | (2006.01) |
| *G11B 5/09* | (2006.01) |
| *G06F 3/06* | (2006.01) |
| *G11B 20/18* | (2006.01) |

(52) U.S. Cl.
CPC .......... *G06F 3/0644* (2013.01); *G06F 3/0604* (2013.01); *G06F 3/0619* (2013.01); *G06F 3/0631* (2013.01); *G06F 3/0676* (2013.01); *G11B 20/18* (2013.01); *G11B 20/1889* (2013.01)

(58) Field of Classification Search
CPC . G11B 27/3027; G11B 2220/90; G11B 5/012; G11B 20/18
USPC .............................. 360/31, 72.1, 72.2, 48, 53
See application file for complete search history.

(56) References Cited

U.S. PATENT DOCUMENTS

| | | | |
|---|---|---|---|
| 5,023,876 A * | 6/1991 | Naito ................. | G11B 20/1866 360/72.2 |
| 5,727,144 A | 3/1998 | Brady et al. | |
| 5,907,672 A | 5/1999 | Matze et al. | |

(Continued)

FOREIGN PATENT DOCUMENTS

| | | |
|---|---|---|
| CN | 100414636 C | 8/2008 |
| CN | 101405700 A | 4/2009 |

(Continued)

OTHER PUBLICATIONS

PCT International Search Report and Written Opinion dated Mar. 30, 2016, issued in related International Application No. PCT/US15/62932 (11 pages).

(Continued)

*Primary Examiner* — Nabil Hindi

(74) *Attorney, Agent, or Firm* — Finnegan, Henderson, Farabow, Garrett & Dunner LLP

(57) ABSTRACT

System and method are disclosed for managing storage space of a magnetic storage device. The system may read data from a first sector of the storage space and determine whether the data are successfully read from the first sector. The system may write updated data to the first sector and a second sector when it is determined that the data are not successfully read from the first sector.

24 Claims, 6 Drawing Sheets

(56) References Cited

U.S. PATENT DOCUMENTS

| | | |
|---|---|---|
| 5,956,196 A | 9/1999 | Hull et al. |
| 5,974,544 A | 10/1999 | Jeffries et al. |
| 6,247,152 B1 | 6/2001 | Russell |
| 6,327,679 B1 | 12/2001 | Russell |
| 6,412,089 B1 | 6/2002 | Lenny et al. |
| 6,427,215 B2 | 7/2002 | Rafanello et al. |
| 7,047,438 B2 | 5/2006 | Smith et al. |
| 7,076,693 B2 | 7/2006 | Ozaki |
| 8,069,384 B2 | 11/2011 | Wei et al. |
| 8,953,265 B1 | 2/2015 | Ma |
| 9,063,662 B1 | 6/2015 | Ma |
| 9,075,714 B1 | 7/2015 | Tsai et al. |
| 9,208,817 B1 | 12/2015 | Li et al. |
| 2004/0100715 A1 | 5/2004 | Smith et al. |
| 2004/0128582 A1 | 7/2004 | Chou |
| 2005/0117506 A1 | 6/2005 | Ko et al. |
| 2008/0192597 A1 | 8/2008 | Hwang et al. |
| 2010/0313076 A1 | 12/2010 | Wei et al. |
| 2011/0047347 A1 | 2/2011 | Li et al. |
| 2011/0222182 A1* | 9/2011 | Park .................. G11B 20/1879 360/31 |
| 2013/0173954 A1 | 7/2013 | Woo et al. |

FOREIGN PATENT DOCUMENTS

| | | |
|---|---|---|
| EP | 0328240 B1 | 6/1994 |
| EP | 0722141 A2 | 7/1996 |
| WO | WO 2003/063161 A2 | 7/2003 |
| WO | WO 2011/019602 A2 | 2/2011 |
| WO | WO 2015/039138 A1 | 3/2015 |

OTHER PUBLICATIONS

Ma et al., "RAIDShield: Characterizing, Monitoring, and Proactively Protecting Against Disk Failures", Proceedings of the 13$^{th}$ USENIX Conference on File and Storage Technologies (FAST'15), Feb. 16-19, 2015, Santa Clara, California, pp. 241-256.

Zhu et al., "Proactive Drive Failure Prediction for Large Scale Storage Systems", 2013 IEEE 29$^{th}$ Symposium on Mass Storage Systems and Technologies, May 6-10, 2013, Long Beach, California (5 pages).

\* cited by examiner

SYSTEM AND METHOD FOR DETERMINATION AND REALLOCATION OF PENDING SECTORS CAUSED BY MEDIA FATIGUE

CROSS-REFERENCE TO RELATED APPLICATION

The present application is a continuation of U.S. patent application Ser. No. 14/643,469, filed on Mar. 10, 2015 (to issue as U.S. Pat. No. 9,208,817 on Dec. 8, 2015), the entire contents of which are incorporated herein by reference.

TECHNICAL FIELD

This disclosure relates generally to storage space management techniques for magnetic storage devices (e.g., hard disk drives). More specifically, it relates to determination and reallocation of pending sectors caused by media fatigue.

BACKGROUND

A hard disk drive (HDD) is a magnetic storage device for storing and retrieving digital data using rotatable disks coated with magnetic materials. An HDD usually includes one or more rigid rotatable disks with magnetic heads arranged on a movable actuator arm to read and write data on the surfaces of the disks. The storage space of an HDD can be divided into a plurality of sectors. Data can be stored in individual sectors. The HDD can also have spare sectors as backups in case one or more sectors experience errors. An HDD may generally have two types of errors: write errors and read errors. A write error occurs when data cannot be successfully written into a sector. When such a write error occurs, the sector into which data cannot be successfully written is usually marked as a bad sector and data will then be reallocated to a different sector, such as a spare sector. A read error occurs when data cannot be successfully read from a sector. When such a read error occurs, however, the sector from which data cannot be read is usually marked as a pending sector, not as a bad sector followed by a reallocation process similar to the write error scenario. This is because the data stored in the pending sector cannot be reliably restored and therefore cannot be reallocated to a spare sector. Instead, the pending sector will be kept in record until updated data is written. If the updated data is successfully written into the pending sector, the pending sector will then be marked as a normal sector.

Performance issues arise, however, when the number of pending sectors becomes high, because additional resources of an HDD system have to be used to track, maintain, and manage the pending sectors. In fact, a high pending sector count on a run-time HDD is a major cause of performance loss. A large number of pending sectors occupy a significant amount of system resources and reduce system performance, causing lower bandwidth, longer latency, higher power consumption, etc.

The pending sector issue becomes worse when a sector repeatedly enters the pending sector status. One cause of such repeated occurrences of a pending sector status is that the sector is subject to media fatigue. A sector subject to media fatigue may retain data in a short period of time (e.g., a temporary retention time) after the data is written but may lose the data thereafter. As a result, the data may not be able to be read from the sector after the temporary retention time, leading to read errors and the pending sector status. However, upon arrival of updated data, the sector may be marked as normal because the updated data may still be successfully written into the sector and be read within a short period. If the updated data is to be read again after the temporary retention time, the sector may once again enter the pending sector status.

Current storage space management techniques do not distinguish media fatigue caused HDD pending sector incidences from other pending sector incidences. Therefore, sectors subject to media fatigue repeatedly enter pending sector status, keeping the pending sector count high and worsening the system performance. The present disclosure is directed to overcoming or mitigating one or more of these problems as set forth above.

SUMMARY

In one aspect, the present disclosure is directed to a method for managing storage space of a magnetic storage device. The method may include reading data from a sector of the storage space and determining whether the data are successfully read from the sector. The method may also include retrieving an address of the sector if it is determined that the data are not successfully read from the sector. The method may further include determining whether the sector is subject to media fatigue based on the address. In addition, the method may include reallocating the sector subject to media fatigue to a spare sector if it is determined that the sector is subject to media fatigue.

In another aspect, the present disclosure is directed to a computer system. The computer system may include a magnetic storage device and a controller for managing storage space of the magnetic storage device. The controller may be configured to read data from a sector of the storage space and determine whether the data are successfully read from the sector. The controller may also be configured to retrieve an address of the sector if it is determined that the data are not successfully read from the sector. The controller may further be configured to determine whether the sector is subject to media fatigue based on the address. In addition, the controller may be configured to reallocate the sector subject to media fatigue to a spare sector if it is determined that the sector is subject to media fatigue.

In a further aspect, the present disclosure is directed to a non-transitory, computer-readable medium. The computer-readable medium may store instructions that, when executed by a processor device, cause the processor device to perform a method for managing storage space of a magnetic storage device. The method may include reading data from a sector of the storage space and determining whether the data are successfully read from the sector. The method may also include retrieving an address of the sector if it is determined that the data are not successfully read from the sector. The method may further include determining whether the sector is subject to media fatigue based on the address. In addition, the method may include reallocating the sector subject to media fatigue to a spare sector if it is determined that the sector is subject to media fatigue.

In a further aspect, the present disclosure is directed to a method for managing storage space of a magnetic storage device. The method may include reading data from a sector of the storage space and determining whether the data are successfully read from the sector. The method may also include writing data to the sector if it is determined that the data are not successfully read from the sector. The method may further include writing a copy of the data written to the sector to another sector.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments of the invention, examples of which are illustrated in the accompanying drawings. When appropriate, the same reference numbers are used throughout the drawings to refer to the same or like parts.

Figure 1:
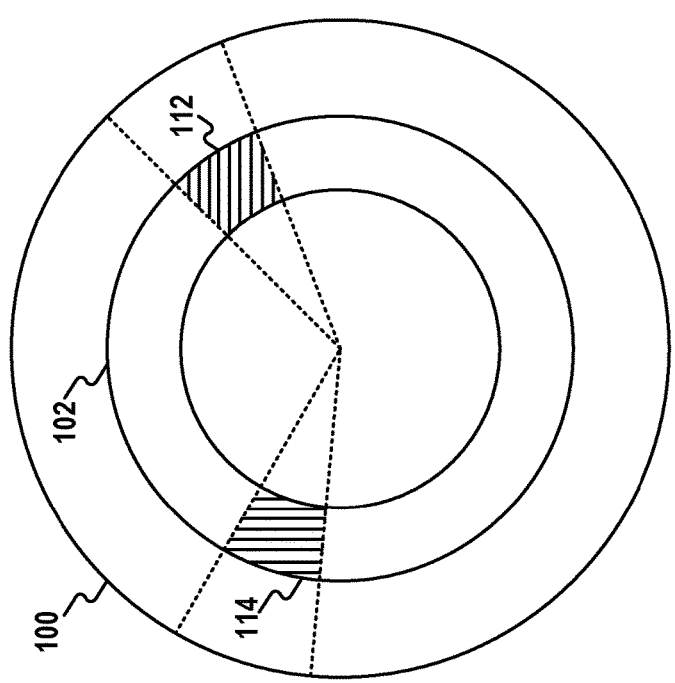
FIG. 1 is a schematic diagram of an exemplary HDD pertaining to one or more aspects of the present disclosure.

Embodiments consistent with the present disclosure involve a magnetic storage device, such as an HDD. An HDD may provide storage space to store data. FIG. 1 is a schematic diagram of an exemplary HDD 100. HDD 100 may include one or more rigid (hard) disks coated with magnetic materials. FIG. 1 shows one such disk. HDD 100 may include a plurality of tracks on the surface of the disk, for example, in the form of thin concentric circular strips. For example, FIG. 1 shows one such track 102. Track 102 may be divided into a plurality of sectors, each as a unit for storing data. For example, FIG. 1 shows sectors 112 and 114 formed on track 102. Some sectors may be used as regular storage units, such as sector 112. Some sectors, normally referred to as spare sectors, may be provided as redundancy or backup storage units to replace bad sectors. For example, sector 114 may be a spare sector. It is noted that although FIG. 1 shows that sectors 112 and 114 are formed on the same track 102, this is only for simplicity of depiction. In practice, a regular sector and a spare sector may or may not form on the same track or on the same disk (in case the HDD includes multiple disks).

HDD 100 may include a magnetic head (not shown, the magnetic head may also be referred to as head for simplicity) for accessing a sector. Accessing a sector may include writing data into the sector and reading data from the sector. For example, prior to data storage, magnetic particles (e.g., particles of the magnetic material coated on the surface of the disk of HDD 100) in a particular sector may be randomly oriented. When data is written to that sector, the head moves over to the surface area of the sector and inscribes data by aligning the magnetic particles in one direction or the other, thereby writing digital "0" (e.g., aligning a magnetic particle in one direction) or digital "1" (e.g., aligning a magnetic particle in the other direction) into the sector. Similarly, when data is read from the sector, the head detects the alignment of the magnetic particles in the sector, thereby reading digital data from the sector.

Because data storage on an HDD relies on the alignment (may also be referred to as polarity) of a group of magnetic particles (also referred to as magnetic media or simply media), it is important for the magnetic particles to be able to retain their alignment over a relatively long period of time to achieve reliable data storage. However, due to repetitive magnetization, head scratching, media aging, imperfect working environment such as temperature variation and air pressure change, etc., the magnetic media may gradually lose their robustness to sustain alignment after magnetization. This phenomenon is called media fatigue. Fatigued media may lose media alignment a certain period of time after the data is recorded. As a result, data stored on fatigued media may not be able to be read out, causing read errors.

HDD storage management techniques provide certain mechanisms to handle data access related errors, such as write errors and read errors. For write errors, the solution is relatively straightforward. This is because write errors are relatively easy to detect and the original data to be written is readily available. For example, when data is to be written into a sector, the head first performs a writing action to record the data into the sector, and then reads the recorded data out to verify whether the recorded data matches the original copy. If there is any error occurs during this write-and-verify process, the sector may be marked as a bad sector and a reallocation process can be carried out right away. In the reallocation process, a spare sector is used to replace the bad sector and the data is then written into the spare sector. The reallocation process may also be referred to as a remapping process, in that any mapping relations established with respect to the bad sector are remapped to the new, spare sector.

Immediate reallocation, however, is generally not available for read errors. This is because the data at issue, i.e., the data stored in the sector undergoing read errors, cannot be read out for reallocation. Instead, the sector is normally marked as a pending sector and recorded by HDD control software or firmware. Later, if an updated version is written and verified successfully, the pending sector status may be removed and the sector is marked as normal.

A large number of pending sectors, however, causes significant performance loss to the HDD system, because system resources are occupied to track, maintain, and manage the pending sectors. This pending sector problem becomes worse when sectors subject to media fatigue are marked as pending repeatedly due to read errors caused by gradually fading data stored in these sectors. As used herein, a sector is subject to media fatigue when media fatigue experienced by magnetic particles in the sector causes repeated read errors and the sector repeatedly enters pending sector status. A sector subject to media fatigue may also be referred to as a fatigued sector. The present disclosure provides system and method to identify such fatigued sectors and effectively mitigate the pending sector problem by removing these fatigued sectors from the pending sector record. Techniques disclosed in this application may be implemented by hardware (e.g., one or more processors, controllers, special or general purpose computers, integral circuits (ICs), printed circuit boards (PCBs), etc.), firmware (e.g., any combinations of memory and program code and data stored therein, embedded systems, etc.), software (program codes or instructions executable by a data processing device to cause the data processing device to perform specific actions), or any combinations thereof.

Figure 2:
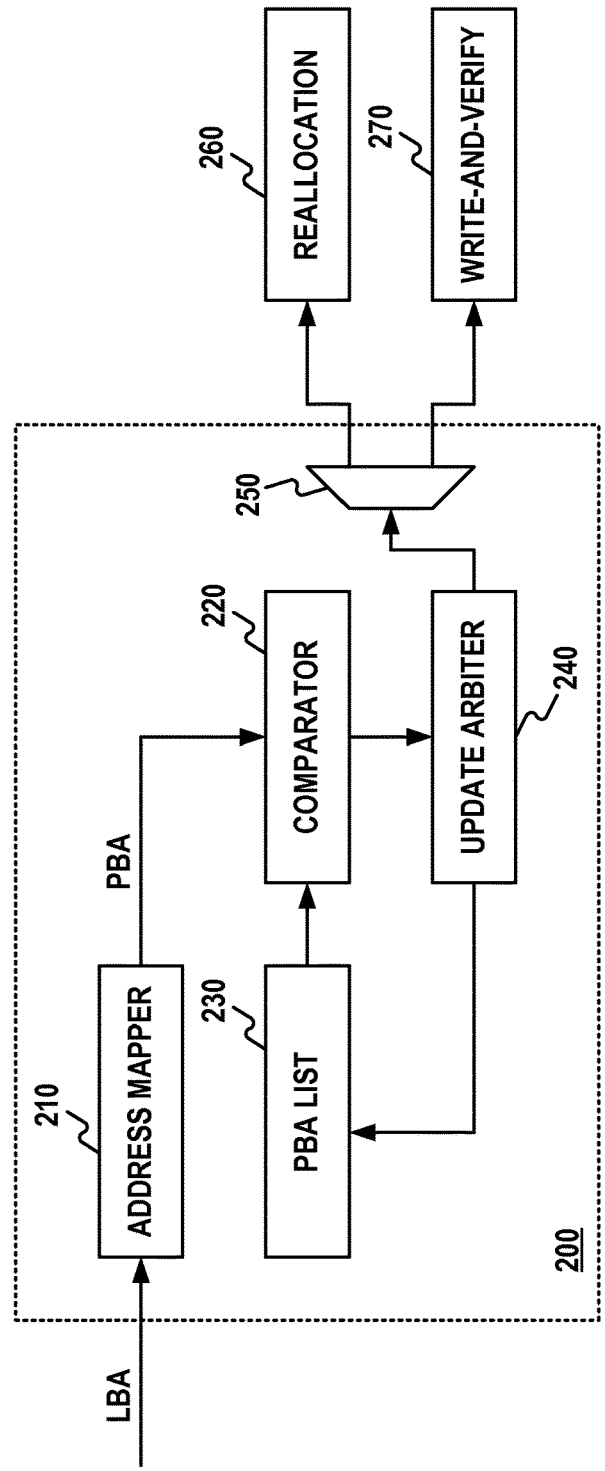
FIG. 2 is a block diagram of an exemplary controller for managing storage space of the HDD shown in FIG. 1, according to some embodiments of the present disclosure.

FIG. 2 shows an exemplary controller 200 for managing storage space of HDD 100. Controller 200 may be designed, configured, and made to implement the disclosed techniques of identifying fatigued sectors and mitigating pending sector problem. As shown in FIG. 2, controller 200 may include an address mapper 210, a comparator 220, a physical block address (PBA) list 230, an update arbiter 240, and a multiplexer 250. Controller 200 may determine whether a sector is subject to media fatigue and carry out either a forced reallocation process 260 (e.g., when media fatigue is detected) or a regular write-and-verify process 270 (e.g., when media fatigue is not detected). The function of individual components of controller 200 will be described in connection with FIG. 3.

Figure 3:
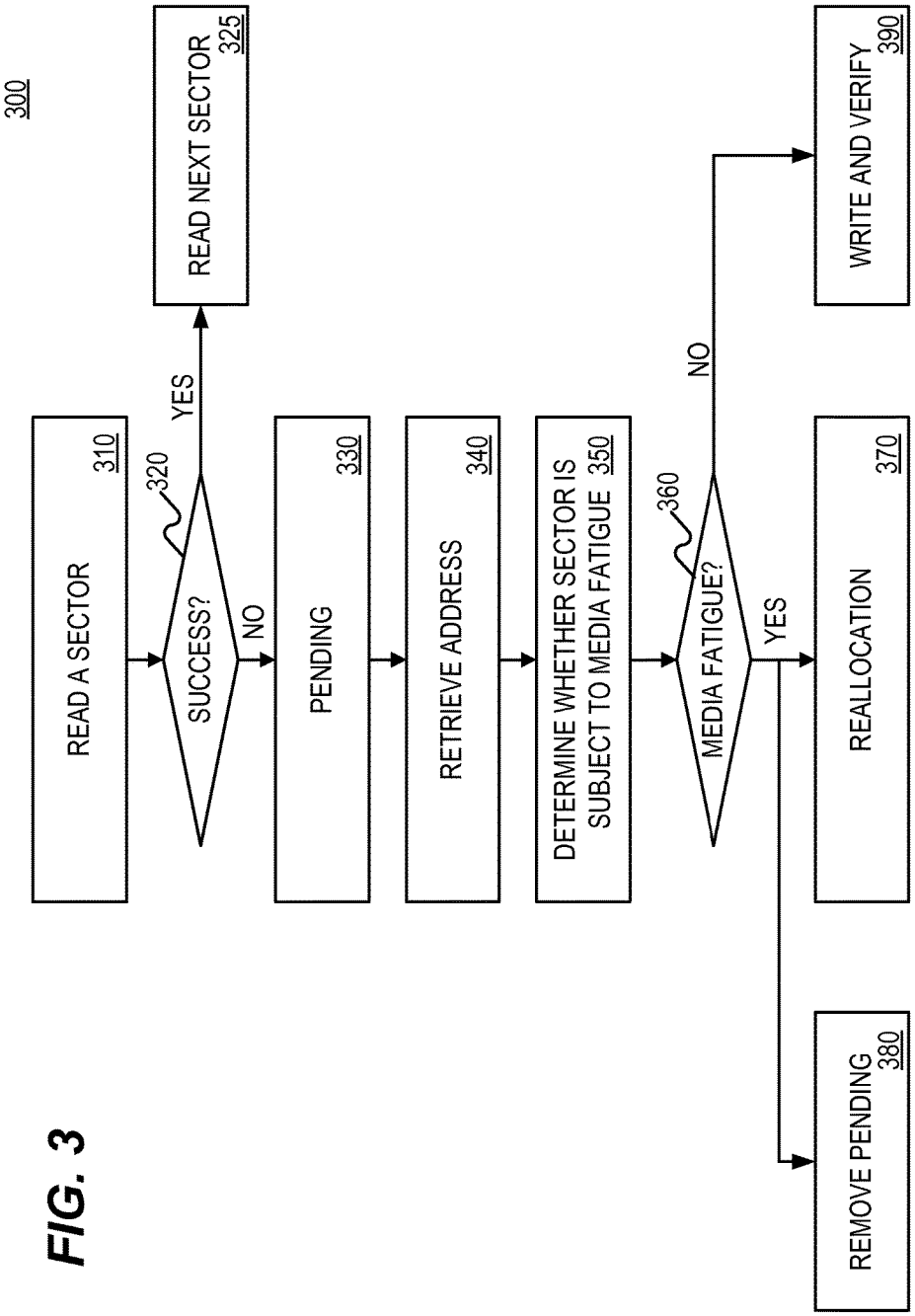
FIG. 3 is a flow chart of an exemplary method for managing storage space, according to some embodiments of the present disclosure.

FIG. 3 is flow chart of an exemplary method 300 for managing storage space of HDD 100. Method 300 includes a plurality of steps, and some steps may be optional. Method 300 starts with step 310, in which controller 200 reads data from a sector. The reading action may be performed using any suitable technique. At step 320, controller 200 determines whether the reading action is successful. If successful, then method 300 proceeds to step 325, in which controller 200 reads the next sector or performs other functions if controller 200 does not need to read more data. If, however, the reading action is unsuccessful, then method 300 proceeds to step 330, in which controller 200 marks the sector as a pending sector. For example, controller 200 may add a pending sector mark to the sector, update the pending sector record, and increase the pending sector count. In some embodiments, controller 200 may retry the reading action one or more times to recover the data if the initial reading action fails. In this case, the outcome of step 320 may be considered as negative when both the initial and a certain number of retry/recover reading action(s) fail.

Once the sector is marked as pending in step 330, method 300 proceeds to step 340 to retrieve the address of the sector. For example, controller 200 may first determine the logical block address (LBA) of the sector, which may ordinarily be used by controller 200 to address and locate the sector. Address mapper 210 may then retrieve the PBA of the sector based on a mapping relationship between the LBA and the PBA. For example, address mapper 210 may access the address-mapping table of HDD 100 to obtain the mapping relationship or store the mapping relationship locally. The retrieved PBA may be used to determine whether the sector is subject to media fatigue at step 350, which will be described in greater detail in connection with FIGS. 4 and 5.

Figure 4:
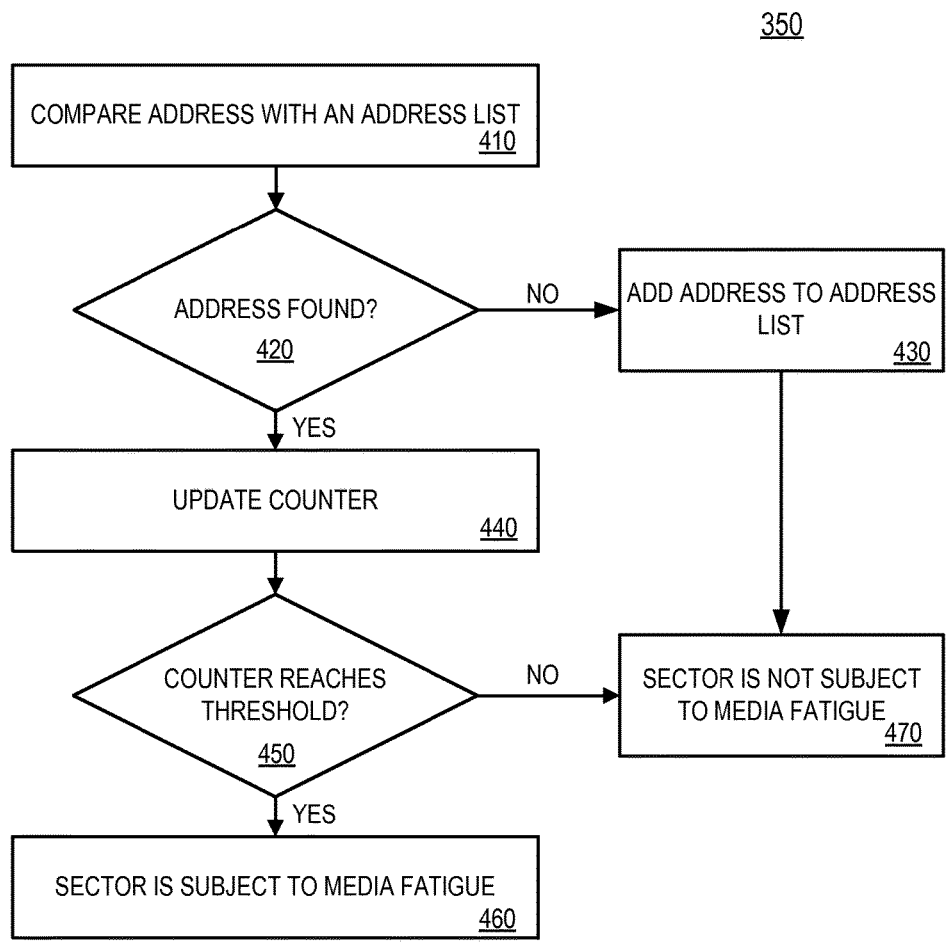
FIG. 4 is a block diagram of an exemplary method for determining whether a sector is subject to media fatigue, according to some embodiments of the present disclosure.

FIG. 4 is a flow chart of an exemplary implementation of step 350. At step 410, comparator 220 compares the PBA retrieved in step 340 with PBA list 230 to determine whether the PBA is present on PBA list 230. PBA list 230 may be a list of PBAs whose corresponding sectors previously experienced read errors (e.g., previously entered pending sector status). Controller 200 keeps a record of such pending sectors using their PBAs to accurately reflect the physical locations of these sectors. Because media fatigue occurs on the physical surface of the disk, keeping a record of the physical locations of these pending sectors may help tracking the root cause of the read errors. At step 420, comparator 220 determines whether the PBA is found on PBA list 230 based on the comparison result at step 410. If the PBA is not found, indicating that this is the first time the corresponding sector experiences read error and enters pending sector status, process proceeds to step 430, in which update arbiter 240 adds the PBA to PBA list 230. From step 430, process proceeds to step 470, in which update arbiter 240 determines that the sector corresponding to the PBA is not subject to media fatigue. The process then returns to step 360 in FIG. 3 and proceeds along the NO branch to step 390, in which update arbiter 240 controls multiplexer 250 to select the regular write-and-verify process 270.

If at step 420, the PBA is found in PBA list 230, indicating that the sector corresponding to the PBA previously experienced read errors and entered pending sector status, update arbiter 240 may update a counter to record the number of occurrences that the PBA is found in PBA list 230. When the counter shows that a particular PBA has been found multiple times in PBA list 230, it indicates that the corresponding sector repeatedly enters pending sector status, and is likely subject to media fatigue. Update arbiter 240 may compare the counter to a predetermined threshold, for example, 2 times, 3 times, 4 times, 5 times, or other values, and determine whether the counter reaches the threshold in step 450. If the PBA has been found in PBA list 230 but the counter has not reached the threshold (the NO branch of step 450), update arbiter 240 may determine that the corresponding sector is not subject to media fatigue (step 470). Thereafter, the process returns to step 360 in FIG. 3 and proceeds along the NO branch to step 390, in which update arbiter 240 controls multiplexer 250 to select the regular write-and-verify process 270.

If at step 450, update arbiter 240 determines that the counter reaches the threshold, the process then proceeds along the YES branch of step 450 to step 460, in which update arbiter determines that the corresponding sector is subject to media fatigue. The process then returns to step 360 and proceeds along the YES branch of step 360. In step 370, update arbiter 240 controls multiplexer 250 to select reallocation process 260 to carry out a forced reallocation. For example, controller 200 may reallocate the sector subject to media fatigue to a spare sector using high priority commands to override the regular write-and-verify process. In step 380, controller may remove the pending sector mark from the sector because upon forced reallocation, the sector subject to media fatigue is in effect treated as a bad sector and is no longer in use.

Figure 5:
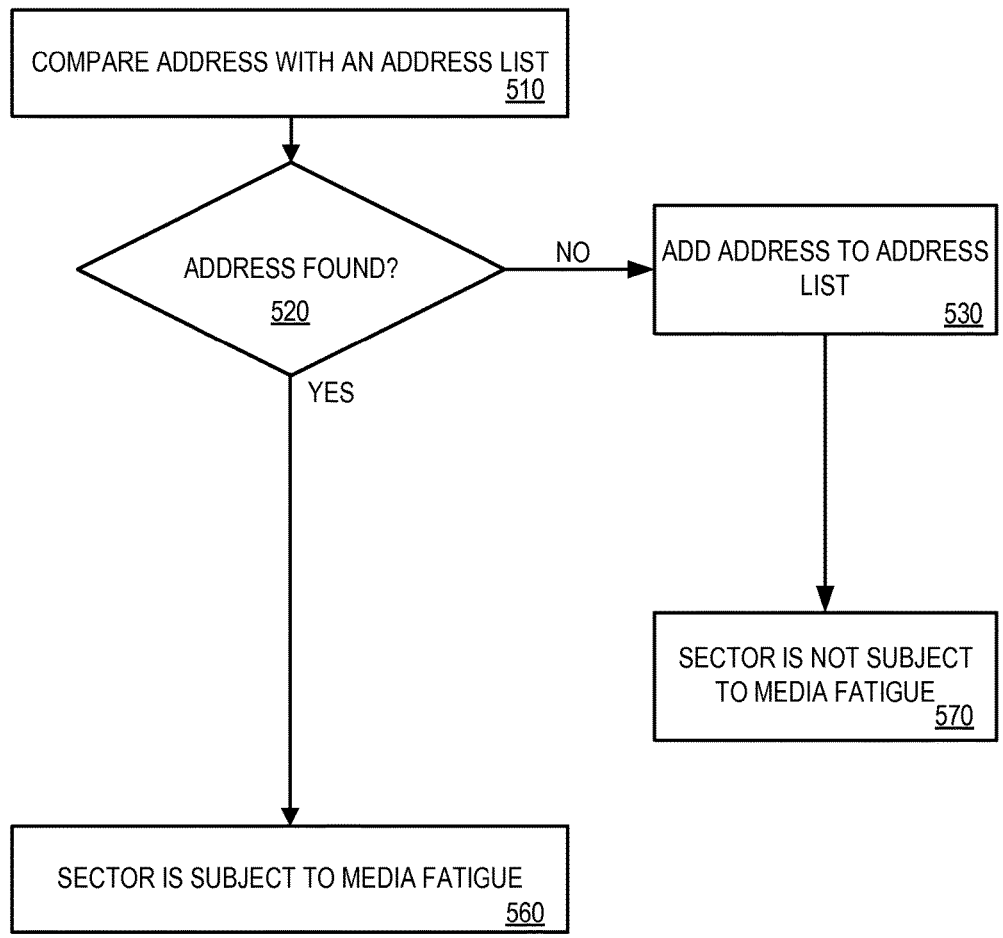
FIG. 5 is a block diagram of another exemplary method for determining whether a sector is subject to media fatigue, according to some embodiments of the present disclosure.

FIG. 5 is a flow chart of another exemplary implementation of step 350. At step 510, comparator 220 compares the PBA retrieved in step 340 with PBA list 230 to determine whether the PBA is present on PBA list 230. At step 520, comparator 220 determines whether the PBA is found on PBA list 230 based on the comparison result at step 510. If the PBA is not found, indicating that this is the first time the corresponding sector experiences read error and enters pending sector status, process proceeds to step 530, in which update arbiter 240 adds the PBA to PBA list 230. From step 530, process proceeds to step 570, in which update arbiter 240 determines that the sector corresponding to the PBA is not subject to media fatigue. The process then returns to step 360 in FIG. 3 and proceeds along the NO branch to step 390, in which update arbiter 240 controls multiplexer 250 to select the regular write-and-verify process 270.

If at step 520, the PBA is found in PBA list 230, indicating that the sector corresponding to the PBA previously experienced read errors and entered pending sector status, the process then proceeds along the YES branch of step 520 to step 560, in which update arbiter 240 determines that the sector is subject to media fatigue. The process then returns to step 360 and proceeds along the YES branch of step 360. In step 370, update arbiter 240 controls multiplexer 250 to select reallocation process 260 to carry out a forced reallocation. For example, controller 200 may reallocate the sector subject to media fatigue to a spare sector using high priority commands to override the regular write-and-verify process. In step 380, controller may remove the pending sector mark from the sector because upon forced reallocation, the sector subject to media fatigue is in effect treated as a bad sector and is no longer in use.

In some embodiments, instead of using the PBA, controller 200 may use the LBA of the sector to determine media fatigue. In such a system, address mapper 210 is bypassed or omitted and PBA list 230 is replaced with a LBA list. In the LBA approach, however, if, in the future, the underlying physical sectors are mapped by other LBAs, the sectors determined as fatigued sectors may be used again.

Figure 6:
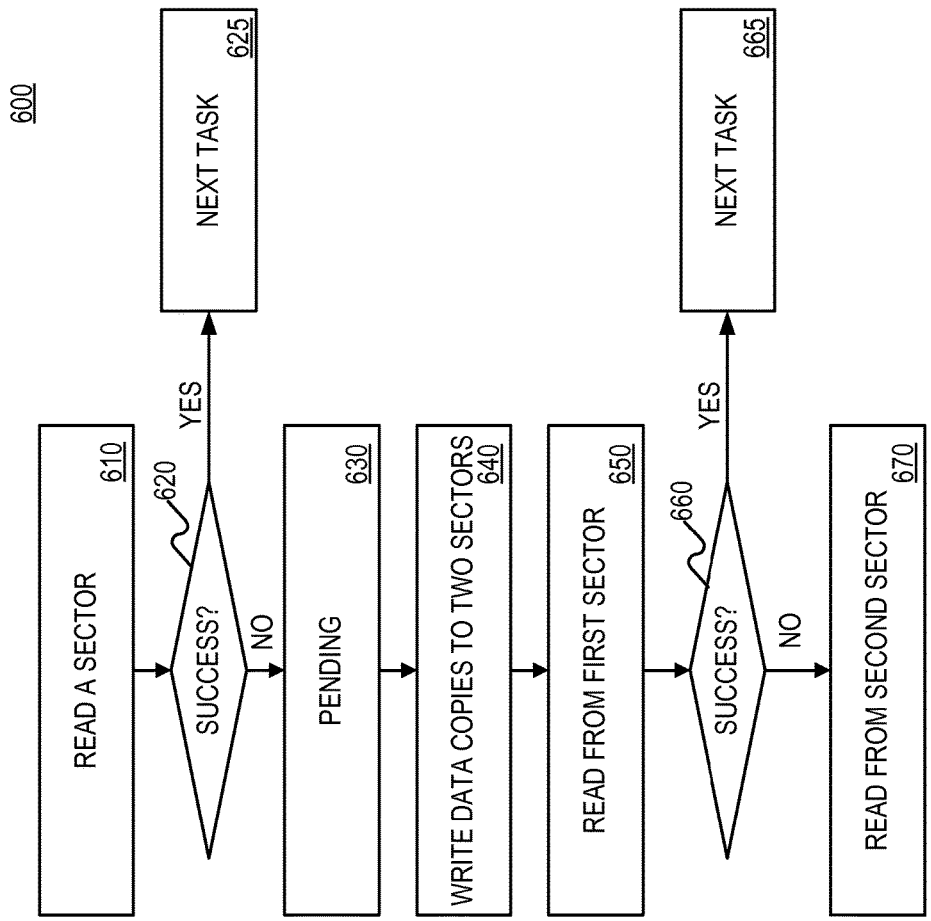
FIG. 6 is a flow chart of another exemplary method for managing storage space, according to some embodiment of the present disclosure.

In some embodiments, the pending sector problem may be lessened by writing multiple copies of update data following a pending sector occurrence. For example, instead of writing the update data only on the pending sector, controller 200 may write one or more copies of the update data into other sectors. The update data can be new data or a new version (e.g., with or without some revisions) of the data previously stored in the pending sector. When read errors later occur, controller 200 may omit the sector experiencing read errors and use the sector without reading errors to read data. Assume that the failure probability of one sector is p, the data reliability can be increased to $1-p''$ if n copies are used. Of course, this approach also reduces the storage capacity of the HDD. FIG. 6 is a flow chart of an exemplary method 600 to implement this approach using two sectors (e.g., storing two copies of the update data). Methods using more sectors can also be similarly implemented. Referring to FIG. 6, an HDD controller such as controller 200 may read data from a sector in step 610. At step 620, controller 200 determines whether the reading action is successful. If successful, then method 600 proceeds to step 625, in which controller 200 performs the next task. If, however, the reading action is unsuccessful, then method 600 proceeds to step 630, in which controller 200 marks the sector as a pending sector. At step 640, when controller 200 writes update data on the pending sector, controller 200 may write the update data to two sectors, for example, the pending sector and another sector. The two copies written into the two sectors may be identical. At step 650, controller 200 may read the update data from either sector. For example, controller 200 may first read data from the previously pending sector at step 650. At step 660, controller 200 determines whether the reading action is successful. If successful, then method 600 proceeds to step 665, in which controller 200 performs the next task. If, however, the data reading from the previously pending sector is unsuccessful, then method 600 proceeds to step 670 to read the identical copy of the data stored in the other sector. In another example, controller 200 may first read data (e.g., at step 650) from the sector that did not encounter read errors at step 610. If unsuccessful, then at step 670 controller 200 reads the copy stored in the previously pending sector. In some other embodiments, the methods for determining whether a sector is subject to media fatigue as described above may be applied, and only when a sector is determined to subject to media fatigue, controller 200 write two or more copies of the data to two or more sectors.

The present disclosure directly connects the physical media condition with the pending sector occurrence, thereby effectively identifying media fatigue based pending sectors. Therefore, the disclosed techniques can effectively reduce pending sector count and improve HDD performance, leading to higher bandwidth, lower power consumption, and lower system burdens on hardware/firmware/software.

The disclosed techniques apply to workstation environment comprising from a single HDD to multiple HDDs. The disclosed techniques also apply to data center environment comprising hundreds or thousands of HDDs. As the number of HDDs increases, the pending sector problem becomes more significant and the performance improvement provided by the present disclosure becomes more valuable.

The specification has described system and method for identifying fatigue sectors and mitigating pending sector problem. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include RAM, ROM, volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for managing storage space of a magnetic storage device, comprising:
    reading data from a first sector of the storage space;
    determining whether the data are successfully read from the first sector; and
    writing updated data to the first sector and a second sector when it is determined that the data are not successfully read from the first sector, wherein the updated data written to the first and second sectors are identical.

2. The method of claim 1, further comprising:
    reading the updated data from the first sector;
    determining whether the updated data are successfully read from the first sector; and
    reading the updated data from the second sector when it is determined that the updated data are not successfully read from the first sector.

3. The method of claim 1, further comprising:
    reading the updated data from the second sector;
    determining whether the updated data are successfully read from the second sector; and
    reading the updated data from the first sector when it is determined that the updated data are not successfully read from the second sector.

4. The method of claim 1, further comprising:
    determining whether the first sector is subject to media fatigue when it is determined that the data are not successfully read from the first sector.

5. A method for managing storage space of a magnetic storage device, comprising:
    reading data from a first sector of the storage space;
    determining whether the data are successfully read from the first sector;
    determining whether the first sector is subject to media fatigue when it is determined that the data are not successfully read from the first sector, wherein determining whether the first sector is subject to media fatigue comprising:
        retrieving an address of the first sector; and
        determining whether the first sector is subject to media fatigue based on the address comprises:
            comparing the address of the first sector with an address list to determine whether the address is present on the address list;
            updating the status of the first sector or the address list based on the comparison; and
    writing updated data to the first sector and a second sector when it is determined that the data are not successfully read from the first sector.

6. The method of claim 4, wherein determining whether the first sector is subject to media fatigue comprising:
    retrieving an address of the first sector, wherein the address is a physical block address, and retrieving the address comprising:
        determining a logical block address of the first sector from which the data are not successfully read; and
        retrieving the physical block address of the first sector based on a mapping relationship between the logical block address and the physical block address; and
    determining whether the first sector is subject to media fatigue based on the address.

7. The method of claim 4, wherein determining whether the first sector is subject to media fatigue comprising:
    retrieving an address of the first sector, wherein the address is a logical block address; and
    determining whether the first sector is subject to media fatigue based on the address.

8. The method of claim 5, wherein updating the status of the first sector or the address list based on the comparison comprises:
    determining that the first sector is subject to media fatigue when the address is present on the address list.

9. The method of claim 5, wherein updating the status of the first sector or the address list based on the comparison further comprises:
    when it is determined that the address is present on the address list, updating a counter to record a number of occurrences that the address of the first sector is determined to be present on the address list; and
    determining that the first sector is subject to media fatigue when the counter reaches a predetermined threshold.

10. The method of claim 5, wherein updating the status of the first sector or the address list based on the comparison further comprises:
    adding the address of the first sector onto the address list when it is determined that the address is not present on the address list.

11. The method of claim 4, further comprising:
    writing the updated data to a plurality of sectors when it is determined that the first sector is subject to media fatigue.

12. The method of claim 4, further comprising:
    reallocating the first sector to a spare sector when it is determined that the first sector is subject to media fatigue.

13. A computer system comprising:
    a magnetic storage device; and
    a controller for managing storage space of the magnetic storage device, wherein the controller is configured to cause the computer system to:
        read data from a first sector of the storage space;
        determine whether the data are successfully read from the first sector; and
        write updated data to the first sector and a second sector when it is determined that the data are not successfully read from the first sector, wherein the updated data written to the first and second sectors are identical.

14. The computer system of claim 13, wherein the controller is configured to cause the computer system to:
    read the updated data from the first sector;
    determine whether the updated data are successfully read from the first sector; and
    read the updated data from the second sector when it is determined that the updated data are not successfully read from the first sector.

15. The computer system of claim 13, wherein the controller is configured to cause the computer system to:
    read the updated data from the second sector;
    determine whether the updated data are successfully read from the second sector; and
    read the updated data from the first sector when it is determined that the updated data are not successfully read from the second sector.

16. The computer system of claim 13, wherein the controller is configured to cause the computer system to:
    determine whether the first sector is subject to media fatigue when it is determined that the data are not successfully read from the first sector.

17. A computer system comprising:
a magnetic storage device; and
a controller for managing storage space of the magnetic storage device, wherein the controller is configured to cause the computer system to:
  read data from a first sector of the storage space;
  determine whether the data are successfully read from the first sector;
  determine whether the first sector is subject to media fatigue when it is determined that the data are not successfully read from the first sector, wherein the determination whether the first sector is subject to media fatigue includes the controller further configured to cause the computer system to:
    retrieve an address of the first sector; and
    determine whether the first sector is subject to media fatigue based on the address, wherein the determination whether the first sector is subject to media fatigue based on the address includes the controller further configured to cause the computer system to:
      compare the address of the first sector with an address list to determine whether the address is present on the address list; and
      update the status of the first sector or the address list based on the comparison; and
  write updated data to the first sector and a second sector when it is determined that the data are not successfully read from the first sector.

18. The computer system of claim 16, wherein the controller is further configured to cause the computer system to:
  retrieve an address of the first sector, wherein the address is a physical block address, and wherein the retrieval of the address includes the controller being further configured to cause the computer system to:
    determine a logical block address of the first sector from which the data are not successfully read; and
    retrieve the physical block address of the first sector based on a mapping relationship between the logical block address and the physical block address; and
  determine whether the first sector is subject to media fatigue based on the address.

19. The computer system of claim 16, wherein the controller is further configured to cause the computer system to:
  retrieve an address of the first sector, wherein the address is a logical block address; and
  determine whether the first sector is subject to media fatigue based on the address.

20. The computer system of claim 17, wherein the controller is configured to cause the computer system to update the status of the first sector or the address list based on the comparison includes the controller further configured to cause the computer system to:
  determine that the first sector is subject to media fatigue when the address is present on the address list.

21. The computer system of claim 17, wherein the controller is configured to cause the computer system to update the status of the first sector or the address list based on the comparison includes the controller further configured to cause the computer system to:
  when it is determined that the address is present on the address list, update a counter to record a number of occurrences that the address of the first sector is determined to be present on the address list; and
  determine that the first sector is subject to media fatigue when the counter reaches a predetermined threshold.

22. The computer system of claim 17, wherein the controller is configured to cause the computer system to update the status of the first sector or the address list based on the comparison includes the controller further configured to cause the computer system to:
  add the address of the first sector onto the address list when it is determined that the address is not present on the address list.

23. The computer system of claim 16, wherein the controller is further configured to cause the computer system to:
  write the updated data to a plurality of sectors when it is determined that the first sector is subject to media fatigue.

24. The computer system of claim 16, wherein the controller is further configured to cause the computer system to:
  reallocate the first sector to a spare sector when it is determined that the first sector is subject to media fatigue.

* * * * *